March 10, 1964     O. G. JEDDELOH     3,124,233
CONVEYOR UNLOADING MECHANISM

Filed Jan. 14, 1963     3 Sheets-Sheet 1

Otto G. Jeddeloh
INVENTOR.

BY Ramsey, Kolisch + Hartwell
Attys.

March 10, 1964  O. G. JEDDELOH  3,124,233
CONVEYOR UNLOADING MECHANISM
Filed Jan. 14, 1963  3 Sheets-Sheet 3
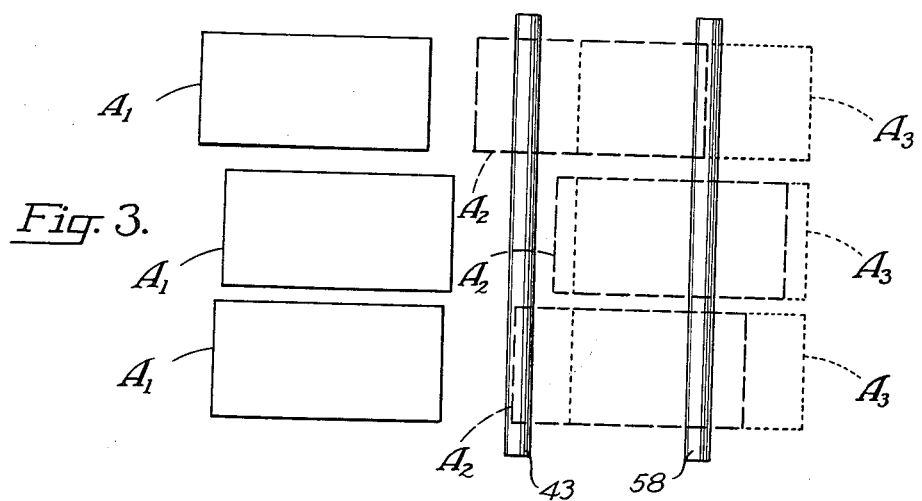
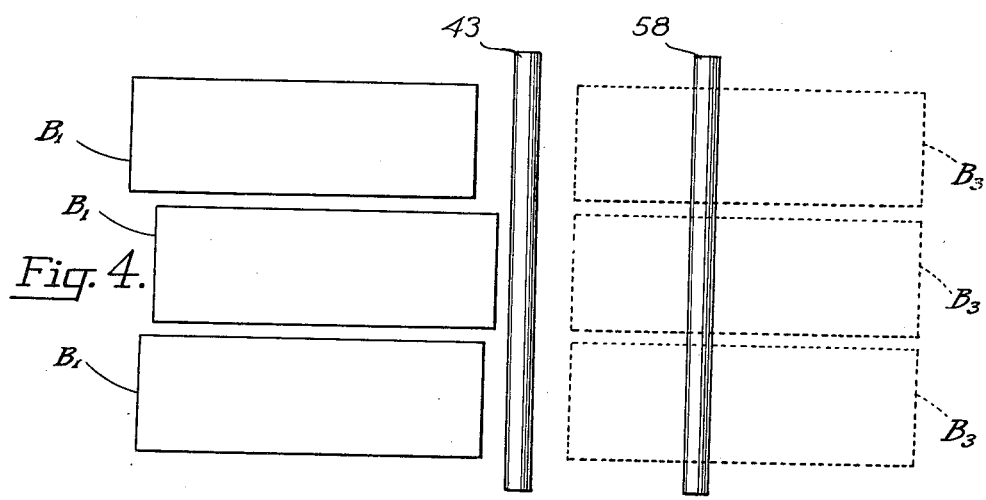
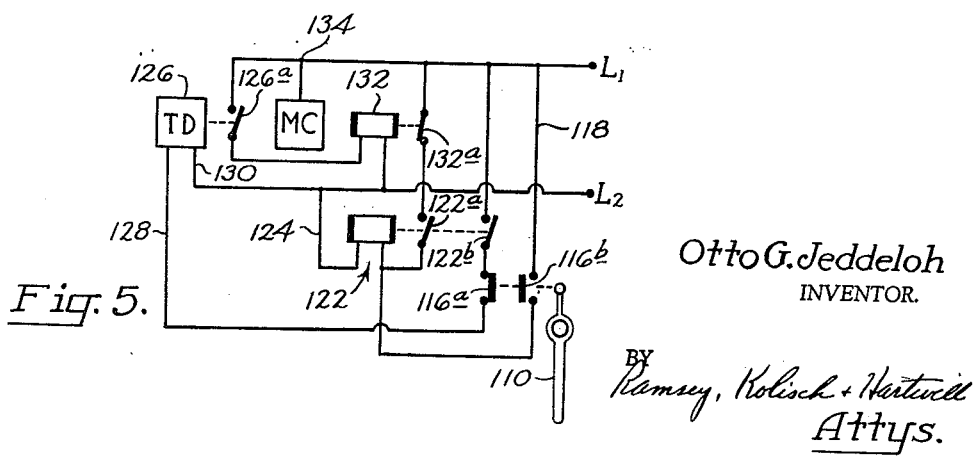
Otto G. Jeddeloh
INVENTOR.
BY Ramsey, Kolisch + Hartwell
Attys.

United States Patent Office 3,124,233
Patented Mar. 10, 1964

3,124,233
CONVEYOR UNLOADING MECHANISM
Otto G. Jeddeloh, 266 Lathrop Road, Grants Pass, Oreg.
Filed Jan. 14, 1963, Ser. No. 251,213
11 Claims. (Cl. 198—34)

This invention relates to novel mechanism for unloading a conveyor, and more particularly concerns unloading mechanism for unloading sheetlike articles from a conveyor, where a plurality of such articles is arranged as a series of groupings on the conveyor and these groupings follow one another along the length of the conveyor. A particular example of a conveyor that handles articles of this type in the manner indicated is a veneer dryer, which includes multiple conveyor decks, each of which is designed to carry charges of veneer sheets one after another through the dryer. The unloading mechanism of this invention may be employed to unload a veneer dryer at the off-bearing end thereof, and deliver the veneer sheets removed onto a conveyor such as the usual "dry chain."

A dryer often occupies a substantial part of the available space in a plywood plant, and thus difficulties are introduced whenever mechanism is provided for unloading the dryer because this usually introduces crowding. A general object of this invention is to provide unloading mechanism, for a dryer or similar type of conveyor, which is capable of performing the unloading function desired, in an entirely practical and satisfactory manner, and which features a relatively compact construction enabling the mechanism to be installed where only a limited amount of space is available.

After veneer sheets leave a dryer, they then may be transported along a "dry chain" or other conveyor, where they are inspected and sorted, prior to making plywood panels therefrom. To facilitate this operation, it is important that the veneer sheets have an orderly arrangement on the conveyor, and be in substantial alignment, withoutout overlapping edges, etc. Therefore, another object of this invention is to provide unloading mechanism for a conveyor, which will deposit articles such as sheets on another conveyor, with such sheets arranged in an orderly manner thereon.

Included within this invention is a novel method for handling sheets, whereby they may be removed from a dryer or like conveyor, with such sheets arranged in an orderly manner and with ends in substantial alignment.

In present day plywood manufacture, veneer sheets may have lengths ranging from four up to fourteen or more feet. It is desirable that different runs of sheets may be handled in a dryer where such runs include sheets of different lengths, without extensive readjustment required in the controls, speeds, etc., of any unloading mechanism provided for the dryer. That is to say, if many adjustments are required in the unloading mechanism to obtain proper timing, flexibility is impaired, since each time a run of sheets of different length is handled, shut-down time for the dryer is introduced. A feature and object of this invention is the provision of unloading mechanism for a dryer, or like conveyor, which can handle with equal facility sheets of different lengths, without any adjustment required in the parts thereof.

Explaining briefly the unloading apparatus contemplated, the apparatus when used with a dryer is mounted adjacent the off-bearing end of the dryer, and includes conveyor means for each deck in the dryer that forms an extension of the deck. The conveyor means includes unloading mechanism or means that withdraws the sheets in a charge of sheets from the dryer deck, and transports them in a path forwardly of the path of travel of the sheets through the dryer. The sheets on traveling through the unloading mechanism have this forward movement accelerated, so that upon their removal from the dryer deck they are spaced ahead of the sheets in a succeeding charge of sheets on the dryer deck. After having their forward movement accelerated, the sheets are aligned by a novel type of friction means that engages the faces of the sheets, and functions to slow down and then stop the sheets. When the sheets all have been stopped, their ends are in substantial alignment. They then may be transported forwardly to a "dry chain," or like conveyor, which may extend laterally to one side of the unloading apparatus.

A feature and object of the invention, therefore, is to provide, in unloading apparatus, means for stopping the forward travel of sheets, comprising friction means engageable with the faces of the sheets, normally their bottom faces. The sheets travel over the friction means, while having their motion retarded until they finally stop. The friction means is constructed so that a braking force directly proportional to the widths of the sheets in a charge is applied, to all sheets in a charge of sheets. Further, the braking is done in a zone that is spaced, for all sheets in the charge, a uniform distance from the end of the dryer. Thus, the braking of the sheets produces end alignment. Because alignment is produced by means that frictionally engages the faces of the sheets, and not by a stop that engages the ends of the sheets, the friction means may be positioned relatively close to the end of the dryer, and may remain in this position for all sheet lengths handled.

Yet another object of the invention is to provide unloading mechanism, for a multideck conveyor, which is substantially simpler than other devices known to date that perform the same function. The simplicity of the apparatus, both with respect to the operating parts included, and the circuits needed for proper control, makes the apparatus ideally suited for the average plywood mill, where reliability and ease of maintenance are important.

These and other objects and advantages are attained by the invention, and the same is described hereinbelow in conjunction with the accompanying drawings, wherein:

FIGS. 3 and 4 illustrate, diagrammatically, the operation of the unloading apparatus, and how it functions to remove sheets from a dryer and then align the ends of such sheets; and FIG. 5 is a schematic drawing, illustrating an electrical control circuit, such as may be provided for controlling the movement of parts in the apparatus.

Figure 1:
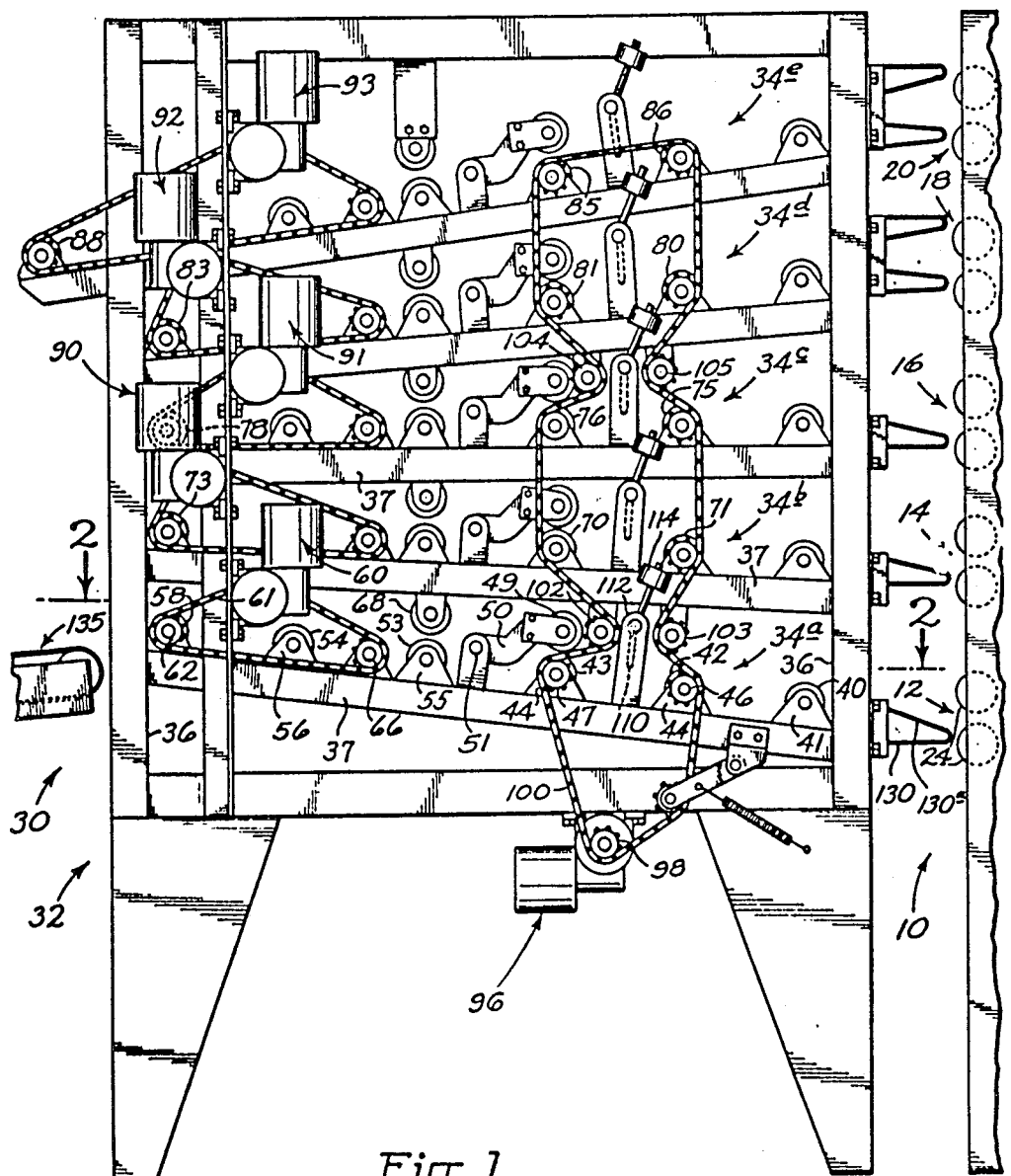
FIG. 1 is a side elevation, of apparatus constructed according to one embodiment of this invention, and showing at the right of the figure the off-bearing end of a dryer, and in front of the dryer unloading apparatus as contemplated.
Figure 2:
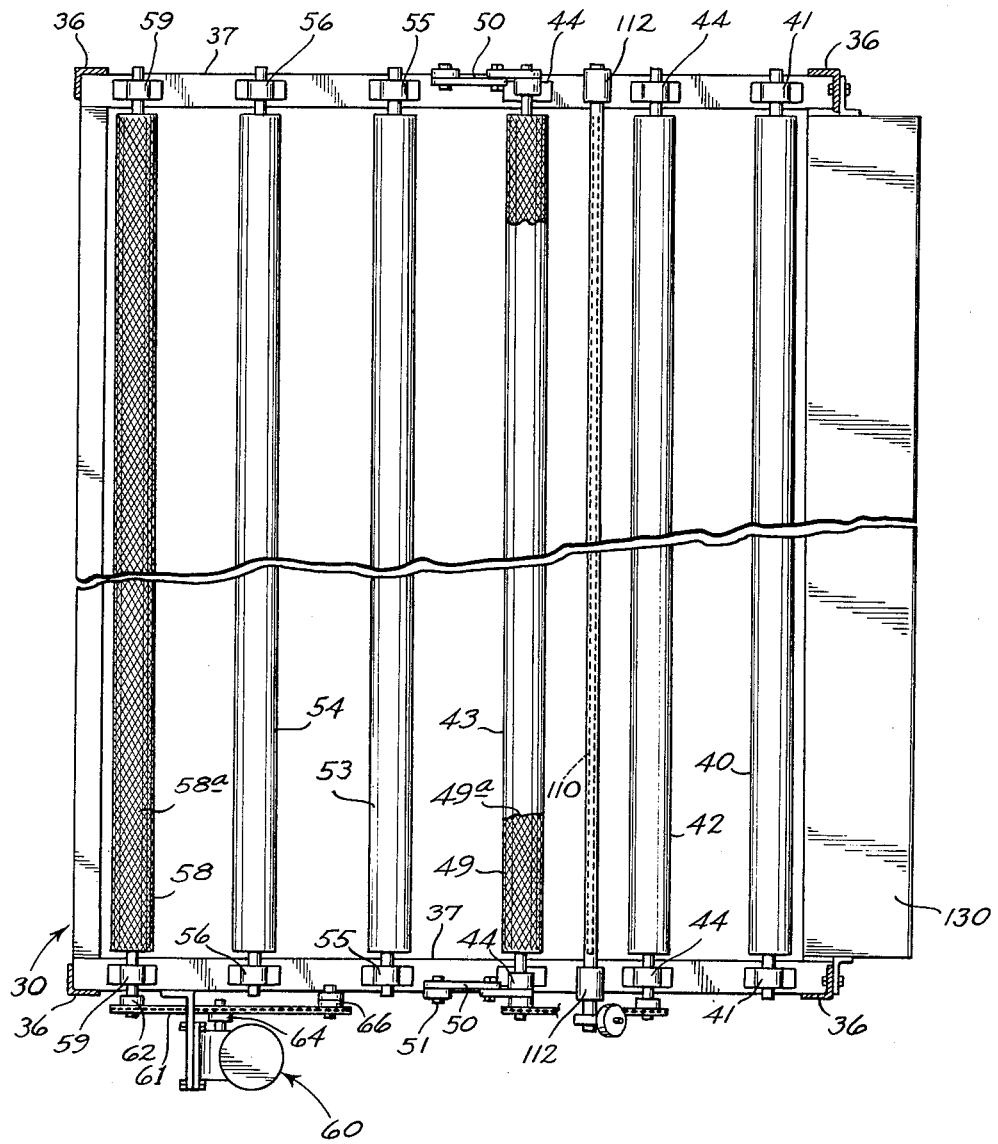
FIG. 2 is a cross-sectional view, taken along the line 2—2 in FIG. 1, of the apparatus illustrated in FIG. 1.

Referring now to the drawings, and more particularly to FIGS. 1 and 2, at the right of the drawings in FIG. 1 is indicated the off-bearing end 10 of a conventional veneer dryer. The dryer shown has five decks, indicated at 12, 14, 16, 18, and 20, respectively. As is conventional, each deck may take the form of a series of smooth-surfaced, paired rolls, such as the pair of rolls 24 for deck 12 shown in FIG. 1. The rolls extend transversely of the dryer, and pairs of rolls follow one another along the length of the dryer. In the dryer, the rolls are rotated under power, so that they are operable to move veneer sheets through the dryer, ordinarily at a relatively slow speed.

Typically, the speed of the veneer sheets may range from five to twenty feet per minute. The veneer sheets in the dryer have moisture removed therefrom, preparatory to making plywood panels from the sheets.

It is conventional for veneer sheets to be fed into the dryer using a dryer feeder. Such a feeder feeds successive charges of sheets to the different dryer decks. The charges of sheets fed into one deck are staggered with respect to the charges fed the other decks. Veneer sheets travel lengthwise through the dryer with each charge (or grouping) of sheets typically comprising from three to six sheets disposed side by side, the exact number of sheets in a charge depending, of course, upon the width of the sheets and the width of the dryer. In a given run, sheets of substantially uniform length are handled, and these are inserted into the dryer with their leading and trailing ends approximately aligned in a direction extending transversely of the dryer. A dryer feeder which performs such a feeding operation is fully disclosed in U.S. Reissue Patent 24,843, issued on July 12, 1960, and reference is made to that patent for a disclosure of such a feeder.

The unloading mechanism for dryer 10 is indicated generally in the drawings at 30. Mechanism 30 includes a frame 32 disposed in front of the off-bearing end of the dryer, and a conveyor means (shown in FIG. 1 at 34a to 34e), for each deck of the dryer, mounted on frame 32. Each of the conveyor means 34a to 34e is operable to transport veneer sheets along a path which is a longitudinal extension of the path of travel of sheets through the dryer defined by the dryer deck feeding the conveyor means. Each conveyor means functions to withdraw sheets in a charge of sheets as they are discharged from a dryer deck, while withdrawing the sheets to speed up the travel of the sheets to produce a space between the sheets withdrawn and the next following charge of sheets, to align the ends of the sheets withdrawn, and then to shift the sheets forwardly, ordinarily onto a "dry chain," where the sheets may be inspected, classified, etc.

Considering now in more detail the construction of unloading mechanism 30, frame 32 comprises a series of uprights 36. Fastened to these uprights, on both sides of the frame, is a series of longitudinally extending supports 37. A pair of these supports is provided for each of the conveyor means 34a to 34e, one being on one side, and one being on the other side of the frame. Each of the conveyor means 34a to 34e comprises a series of rollers, with ends supported on a pair of the supports, as will now be described.

With particular reference to conveyor means 34a, journaled on frame 32, by means of bearings 41 fastened to supports 37, and adjacent the infeed end of the apparatus, is a transversely extending roller 40. Roller 40 is a smooth-surfaced roller, and may be, as in the embodiment of the invention disclosed, a nonpowered roller. The function of roller 40 is to guide the ends of sheets traveling into the apparatus, and support the sheets, while the same are pushed forwardly by the dryer deck behind it.

Directly in front of roller 40 is a pair of unloading, or withdrawing, rollers shown at 42, 43. These also are journaled on frame 32, by means of bearings 44. Provided at one set of ends of rollers 42, 43 are sprockets 46, 47. The sprockets, which are secured to the rollers, are used for rotating the rollers under power, by means to be described. Rollers 42, 43 also may be smooth-surfaced rollers, as shown.

Superimposed over roller 43 is a roller 49. This roller has ends journaled on arms 50, that are pivoted by pivot means 51, on supports 37. Roller 49 is urged by gravity against roller 43, and functions to press veneer sheets that travel thereunder down on roller 43 beneath it. Roller 49 may be provided with a yieldable outer covering, such as the rubber covering indicated at 49a whereby a more even pressure is exerted by the roller downwardly on sheets traveling thereunder. Rollers 43, 49 constitute pinch rollers in the construction.

Rollers 42 and 43 (and roller 49 which is driven by roller 43) are normally rotated at a considerably faster speed than the rollers in the dryer. Thus, when veneer sheets engage these rollers, they are caused to be withdrawn from the dryer, with the sheets as they are withdrawn traveling at a considerably faster speed than their travel speed through the dryer. Typically, the withdrawal speed of the veneer sheets may be some three or four times the speed of the sheets on a dryer deck. A spacing is desired between each charge of sheets withdrawn from the dryer and the charge succeeding it, to give time to permit end alignment of the sheets, and then ejection of the sheets from the apparatus, before the following charge enters the apparatus. By withdrawing the sheets of a charge at a faster speed than their speed in the dryer, this spacing is produced.

Toward the front (or off-bearing end) of the apparatus from the rollers just described, are rollers 53, 54. Rollers 53, 54 also may be smooth-surfaced rollers. The rollers are journaled on the frame of the apparatus, in bearings 55, 56, respectively. Like roller 40, rollers 53, 54 are nonpowered, or idler rollers. The function of these rollers is primarily to guide the ends of sheets, as the sheets are shifted forwardly by pinch rollers 43, 49.

Directly adjacent the off-bearing end of the apparatus, and supporting the bottom faces of sheets advanced thereover by the pinch rollers, is a braking roller 58. Roller 58 is journaled in bearings 59. About the perimeter of roller 58 is a high coefficient of friction covering, such as rubber covering 58a.

Roller 58 is driven intermittently. An intermittently operated motor 60 mounted on frame 32 is connected, for driving purposes, to roller 58, by means of a drive chain 61. Chain 61 is trained over a sprocket 62 secured to the roller, a motor-driven sprocket 64, and an idler sprocket 66. When motor 60 is running, roller 58 is rotated to cause veneer sheets supported thereon to be shifted to the left in FIG. 1, and out of the unloading apparatus. When the motor is not running, roller 58 is stationary, and the outer surface of covering 58a constitutes a breaking surface that slows down, and then stops, sheets traveling thereover, by braking movement of the faces of the sheets thereacross.

Conveyor means 34a also includes a roller 68 (see FIG. 1) journaled on the frame and disposed above idler roller 53. When veneer sheets leave pinch rollers 43, 49, and with roller 58 stationary, the sheets come to a stop rapidly, with their trailing ends above roller 53. The forward ends of the sheets, especially if the sheets are long, may project a considerable distance beyond the front end of the apparatus. Roller 68 is provided to hold down the rear or trailing ends of the sheets, to prevent these ends from tipping up, and the sheets then possibly falling out of the apparatus.

Conveyor means 34b, 34c, 34d, and 34e may be similar in construction to conveyor means 34a just described. Thus, and considering conveyor means 34b, rollers 70, 71 are the unloading rollers for the conveyor means, and roller 73 is the rubber-covered braking roller that corresponds to rubber-covered braking roller 58. In conveyor means 34c, rollers 75 and 76 are the unloading rollers, and roller 78 is the braking roller. In conveyor means 34d, the unloading rollers are shown at 80 and 81, and the braking roller is shown at 83. In conveyor means 34e, rollers 85, 86 are the unloading rollers, and the braking roller is indicated at 88.

Each conveyor means also has an intermittently operated motor, corresponding to motor 60, that rotates the braking roller of conveyor means 34a. These motors are indicated at 90, 91, 92, and 93. Each is operatively connected to a braking roller, to rotate the roller when the motor is running, by means of a drive chain similar to chain 61.

As discussed earlier, the unloading or withdrawing rollers are rotated under power. Ordinarily, these rollers are rotated constantly. The means for rotating these rollers will now be described, and reference is made in particular to FIG. 1. As can be seen with reference to this figure, mounted on frame 32, beneath conveyor means 34a, is a motor 96, which is operatively connected to a drive sprocket 98. Trained over the drive sprocket, and sprockets such as sprockets 46, 47 secured to the ends of the unloading rollers, is a drive chain 100. Also training the drive chain are idler sprockets 102, 103, 104, and 105. With the motor running, the sprockets connected to the unloading rollers are driven in a counter-clockwise direction in FIG. 1, with the result that the unloading rollers themselves are driven in the same direction, and sheets traveling over the rollers are shifted from right to left in the figure.

Each conveyor means is provided with a gate extending transversely of the path of travel of veneer sheets thereover, and disposed intermediate the unloading rollers for the conveyor means. Considering conveyor mean 34a, such a gate is shown at 110. Gate 110 is pivoted on frame 32, by means of bearings 112, and extends downwardly from its pivot mounting on the frame into the path of veneer pieces traveling over unloading rollers 42, 43. In the absence of any veneer pieces on the unloading rollers, gate 110 has the lowered position indicated in FIG. 1. Veneer pieces traveling into the gate swing the gate to the left about the pivot mounting provided by bearings 112. The gate functions as a detector and senses the presence or absence of sheets traveling into a conveyor means. A counterweight for the gate is indicated at 114.

Gate 110 operates a control circuit for electric motor 60, whereby the gate functions to control operating periods of the motor, the motor normally running intermittently when the unloader is in use. The control circuit is illustrated schematically in FIG. 5. This control circuit will be described in detail, and it should be understood that the other gates in the unloader may operate similar control circuits whereby they function to control the operating periods of the respective motors that rotate the rollers in front of the gates.

Referring to FIG. 5, in the control circuit illustrated gate 110 is ganged to a pair of switches 116a, 116b (switch 116a is closed and switch 116b is open with gate 110 lowered and in the position it assumes when no veneer is passing under the gate). Connecting a source conductor L₁ to a source conductor L₂ through switch 116b, when the latter is closed, are conductors 118, 120, the solenoid of a relay 122, and conductor 124. Relay 122 is a setting relay, and includes switches 122a, 122b that are normally open and that close when the relay is energized.

At 126 is indicated a conventional time delay mechanism, including a switch 126a. With switches 122a and 116a closed, a circuit is completed to time delay mechanism 126 from source conductor L₁ to source conductor L₂ through conductors 128, 130. With a circuit completed to delay mechanism 126, the same becomes energized and normally open switch 126a closes. When mechanism 126 becomes de-energized, by breaking the circuit to the mechanism, switch 126a opens, but only after the lapse of a predetermined time interval.

A motor-starting solenoid is indicated at 132. Solenoid 132 is ganged to switches (not shown) in motor controller unit 134 that are actuated to start motor 60 when solenoid 132 is energized, and these are actuated to stop the motor upon de-energizing of solenoid 132. Also ganged to solenoid 132 is a normally closed reset switch 132a, that opens upon energizing of solenoid 132.

Explaining the operation of the control circuit illustrated in FIG. 5, prior to any veneer reaching unloading rollers 42, 43 of conveyor means 34a, the various switches are as shown, motor 60 is stopped, and braking roller 58 is stationary. On a charge of veneer traveling into gate 110, the gate swings upwardly to open switch 116a and close switch 116b. This causes energizing of setting relay 122 and closing of switches 122a, 122b.

Nothing further happens until the last piece of veneer in the veneer charge travels beyond gate 110. Thus, as the sheets of veneer in the charge travel past the gate, they are fed forwardly in the unloading apparatus by pinch rollers 43, 49, with such sheets sliding over the braking roller, which continues to be stationary. Any sheets in the charge that travel beyond pinch rollers 43, 49, before gate 110 swings down to its original position, quickly are stopped by the braking action of the braking roller.

On the trailing end of the last sheet in the charge of sheets passing beyond gate 110, the gate drops, and switches 116a, 116b open and close, respectively. Upon switch 116a closing (switch 122b now being closed), a circuit is completed to time delay mechanism 126, and switch 126a closes. As a result, solenoid 132 becomes energized, switches in controller 134 are actuated to start motor 60, and switch 132a opens. With opening of switch 132a, the solenoid of relay 122 de-energizes and switches 122a, 122b open. Motor 60 continues to run until switch 126a opens, which is after a predetermined time lapse from the time switch 122b opens, said time lapse being sufficient for all sheets of veneer to have moved beyond roller 58.

Completing the description of the apparatus, guide elements 130 are mounted on frame 32 adjacent the infeed end of each conveyor means in the apparatus. Each element extends transversely of the path of travel of sheets into the unloader, and has an upper surface, such as surface 130a, that deflects the lead ends of sheets passing from the dryer into the appropriate deck of the unloading apparatus.

On the off-bearing side of the unloading apparatus, a conveyor 135 is shown, that receives sheets discharged by the unloading apparatus. Conveyor 135 may feed these sheets onto a "dry chain" or conveyor (not shown), where the sheets may be inspected, sorted, etc.

Explaining now the operation of the apparatus as a whole, as already mentioned, sheets conventionally are fed into the dryer in successive charges, each containing plural sheets of uniform length aligned transversely of the dryer. The charges fed into one deck are staggered with respect to the charges fed into the other decks. Thus, the charges come out of the dryer, first from one deck and then from another. In the usual instance, when the sheets in a charge finally arrive at the off-bearing end of the dryer, some misalignment of the sheets has occurred, because of slippage, etc., and this misalignment is shown in FIG. 3 by the sheets in solid outlines at $A_1$.

On the sheets in a charge traveling from a dryer deck into the pinch rollers of a conveyor means in the unloader apparatus, their movement is accelerated, which spaces the sheets from the sheets in the next following charge. This has the effect of increasing the misalignment of the sheets, as shown by the sheets in dashed outlines at $A_2$. End alignment is now desirable for proper handling of the sheets, which is accomplished by the braking roller provided in each conveyor means of the unloader.

End alignment results when the sheets are ejected from the pinch rollers and have their forward progress braked by the stationary brake roller. Each sheet in a charge when it leaves the pinch rollers has the same speed as the other sheets in the charge. The momentum of a sheet is approximately directly proportional to its width. The braking force applied by the braking roller is also approximately directly proportional to the width of a sheet. Braking force is applied in a zone which for all sheets is the same distance from the pinch rollers. Thus, the various sheets in a charge come to rest with their leading and trailing ends spaced substantially a uniform distance in front of the pinch rollers, which means that their ends are again in alignment in a direction extending transversely of the unloader. Sheets with ends aligned as they would be after coming to a stop on the braking roller are shown in dotted outline at $A_3$.

After end alignment, sheets are removed out of the unloader by rotating the braking roller. The braking roller stops before the next charge of sheets handled passes thereover.

The braking roller preferably is within a sheet length of the pinch rollers. This means that a braking force is applied on all sheets in a charge before they clear the pinch rollers and results in minimum tendencies for the sheets becoming overlapped at their side edges.

Each deck operates substantially as described. In a dryer, after one deck has been unloaded of a charge of sheets, then another deck is unloaded of another charge of sheets. These travel onto conveyor 135, after the first charge has cleared conveyor 135.

With reference now to FIG. 4, here a charge of sheets is shown indicated in solid outline at $B_1$, where the sheets are considerably longer than those previously discussed. These sheets, although longer, travel through the unloader in substantially the same manner as the first charge of sheets discussed. Any misalignment is straightened out by the braking action of the braking roller when the sheets leave the pinch rollers, as indicated by the sheets shown in dotted outline at $B_3$. With longer sheets, the lead ends of the sheets after alignment project farther forward than do the lead ends of the sheets when shorter sheets are handled.

Thus, it will be noted that the unloading apparatus operates equally well with long or short sheets. Braking is not by means of any stop bar, which the lead end of the sheets strikes, and thus there is no need to change the position of any such bar to accommodate differences in the length of sheets in different runs handled. The braking roller automatically accommodates the different sheet lengths while producing alignment.

In addition to the advantages discussed above, it will be noted that the unloader is relatively compact. The speed up and stopping of the sheets is done in apparatus which is but little longer than the shortest sheets handled.

It will also be noted that the unloader is free of any jump belts or similar means that wear and introduce maintenance problems. The use of the braking roller, both for stopping the sheets, and for shifting the sheets out of the unloader, minimizes complexity. No complicated control circuits are necessary.

While an embodiment of the invention has been described, it should be obvious that variations and modifications are possible without departing from the invention. It is desired to cover all such modifications as would be apparent to one skilled in the art, and that come within the scope of the appended claims.

It is claimed and desired to secure by Letters Patent:

1. For sheet-handling apparatus including a multideck conveyor, apparatus for unloading sheets from the decks of the conveyor comprising
   unloading means for each deck,
   said unloading means including speed-up means for withdrawing sheets from the deck at a faster speed than their speed of travel through the conveyor, and
   a receiving station for each deck positioned to receive sheets from the deck's unloading means,
   said receiving station including friction means positioned to one side of the path of sheets thereinto engageable with the faces of the sheets,
   said friction means operating to stop the travel of sheets delivered into the receiving station by braking the movement of the faces of the sheets thereacross.

2. For sheet-handling apparatus including a multideck conveyor, apparatus for unloading sheets from the decks of the conveyor comprising
   unloading means for each deck,
   said unloading means including speed-up means for withdrawing sheets from the deck at a faster speed than their speed of travel through the conveyor, and
   a receiving station for each deck positioned to receive sheets from the deck's unloading means,
   said receiving station including friction means positioned to one side of the path of sheets thereinto engageable with the flat faces of the sheets,
   said friction means operating to stop the travel of sheets delivered into the receiving station by braking the movement of the faces of the sheets thereacross,
   said receiving station further including intermittently operated means operable when actuated to shift sheets from the receiving station.

3. For sheet-handling apparatus including a multideck conveyor, apparatus for unloading sheets from the decks of the conveyor comprising
   unloading means for each deck,
   said unloading means including speed-up means for withdrawing sheets from the deck at a faster speed than their speed of travel through the conveyor, and
   a receiving station for each deck positioned to receive sheets from the deck's unloading means,
   said receiving station including friction means positioned under the sheets which the sheets travel over on traveling into the receiving station,
   said friction means engaging the bottom faces of the sheets and stopping the movement of the sheets by braking the movement of said bottom surface thereover.

4. The unloading apparatus of claim 3, wherein said receiving station further includes intermittently operated means operable when actuated to move said friction means whereby sheets are shifted from the receiving station.

5. For sheet-handling apparatus including a multideck conveyor, apparatus for unloading sheets from the decks of the conveyor comprising:
   unloading means for each deck,
   said unloading means including speed-up means for withdrawing sheets from the deck at a faster speed than their speed of travel through the conveyor, and
   a receiving station for each deck positioned to receive sheets from the deck's unloading means,
   said receiving station including elongated friction roller means extending transversely and positioned to one side of the path of travel of sheets into the receiving station,
   said friction roller means having a high coefficient of friction surface engageable with the faces of the sheets,
   said friction roller means operating to stop travel of sheets delivered to the receiving station by braking the movement of the faces of the sheets thereacross.

6. The unloading apparatus of claim 5, wherein said receiving station further includes
   intermittently operated driving means, and
   means drivingly connecting said driving means to said friction roller means with the driving means operable to rotate said roller means to cause shifting of the sheets from the receiving station on operation of the driving means.

7. A method of handling sheets traveling on a conveyor where the sheets are arranged in successive groupings, with each grouping containing plural sheets disposed in a row and extending transversely of the path of travel of the sheets through the conveyor, the method comprising
   transporting each grouping of sheets on its arrival adjacent the off-bearing end of the conveyor forwardly of said conveyor end at a speed faster than the speed of travel of the group through the conveyor, thus to produce a spacing between the grouping transported and the next following grouping,
   braking the travel of the grouping of sheets after so transporting it forwardly by frictionally engaging the faces of the sheets in the grouping,
   during the braking of the grouping of sheets aligning the sheets in the grouping by applying a braking force against all of the sheets which is directly proportioned to the width of the sheets and which is at a location that for the various sheets is spaced a uniform distance forwardly of said end of the conveyor, and after such braking of the travel of the grouping of sheets again moving all of the sheets forwardly.

8. The method of claim 7, wherein sheets of substantially uniform length are selected for travel on the conveyor, and wherein the braking of the sheets in a grouping is done in a zone spaced forwardly of said end of said conveyor a distance less than the length of the sheets.

9. Unloading apparatus for unloading sheets from the decks of a multideck conveyor comprising a frame, means mounted on the frame for each deck of the conveyor operable to transport sheets along a path which is a forward extension of the path of travel of the sheets on the deck of the conveyor, said means comprising transversely extending power-driven pinch roll means adjacent the feed end of the unloading apparatus for pulling sheets from the conveyor deck, and a transversely extending roller means disposed toward the off-bearing end of said unloading apparatus from said pinch roll means, sensing means for each pinch roll means for sensing the presence of sheets traveling through the pinch roll means, a motor for each transversely extending roller means drivingly connected to the roller means, and control means connecting the sensing means for each pinch roll means and the motor for the transversely extending roller means in front of the pinch roll means, said control means being operable to stop said motor when sheets are traveling through said pinch roll means.

10. The unloading apparatus of claim 9, wherein said roller means includes a high coefficient of friction covering.

11. The unloading apparatus of claim 10, wherein each sensing means comprises a gate disposed between a pinch roll means and its roller means, and said control means includes means for starting the motor of a roller means with such starting done at a predetermined time after sheets have traveled beyond said fence.

References Cited in the file of this patent

UNITED STATES PATENTS 3,087,597     Jeddoloh _____ Apr. 30, 1963